3,454,527
PROCESS FOR POLYMERIZING CHLORAL
Otto F. Vogl, Wilmington, Del., assignor to E. I. du Pont de Nemours and Company, Wilmington, Del., a corporation of Delaware
No Drawing. Filed Nov. 18, 1965, Ser. No. 508,569
Int. Cl. C08g 1/08
U.S. Cl. 260—67  6 Claims

ABSTRACT OF THE DISCLOSURE

An improved orientable high molecular weight polychloral from which formed articles which are tough, non-foraminous, cohesive, and infrangible, can be made by a process involving the steps of preparing a homogeneous mixture of chloral, an anionic polymerization initiator for the chloral and from 0 to 40% of the weight of the chloral of an aprotic liquid for facilitating the uniform dispersion of the initiator, either as a solid or as a solute, throughout the chloral at a temperature above the polymerization threshold temperature of the chloral, cooling the polymerization mixture below the polymerization threshold temperature to induce polymerization without agitation, and finally separating the aprotic liquid from the polymer.

---

This invention relates to polychloral having improved physical properties and, more particularly, to non-foraminous polychloral and to a process for its preparation.

Monomeric chloral is a colorless liquid which reacts with water to form a low-melting, crystalline hydrate which is highly soluble in water. The monomer can be polymerized to a low molecular weight solid polymer having a linear polyacetal structure. Such polymer is readily depolymerized by contact with water or mild heating and is therefore unsuitable for articles requiring durability. A high molecular weight, water stable, polychloral can be prepared by treating chloral with ionic initiators. The higher molecular weight polymer has invariably been obtained in the form of foraminous structures which are frangible and readily crumble to a granular or powdery state. Thus, shaped articles of this polymer could not be handled.

Polychloral which is distinguishable from the prior art high molecular weight polychloral of inferior properties by being tough and by forming articles which are non-foraminous, cohesive, and infrangible has now been discovered. The polychloral of this invention differs from the prior art linear polychloral in the same way, in addition to being a higher molecular weight and water stable or water insensitive. As a result of this discovery, useful articles such as rods, bars, billets, plates, films, tubes, or moldings can now be made from polychloral. The outstanding feature of the polychloral of this invention is its being free of voids, as manifested by the other improved properties. In contrast the prior art polychloral has always been unsuitable for forming durable solid articles.

The improved polychloral of this invention is made under critical process conditions involving a series of steps commencing with the preparation of a homogeneous mixture of chloral, an anionic polymerization initiator for the chloral, and from 0 to 40 percent of the weight of the chloral of an aprotic liquid for facilitating the uniform dispersion of the initiator either as a solid or as a solute, throughout the chloral. The temperature at which the polymerization mixture is formed must be above the temperature at which polymerization occurs in any significant amount, whereby the mixture is stable as well as homogeneous. The temperature at which polymerization occurs in any significant amount is called the threshold temperature and is critical for the reason that should polymerization occur before the homogeneous mixture is obtained, i.e., should the mixture be unstable, the resultant infusible polychloral will be lumpy and foraminous and have the disadvantageous properties previously described. The precise threshold temperature will vary with the particular polymerization mixture employed. The threshold temperature is between 30 and 60° C.

The next step in the process is cooling the polymerization mixture below the polymerization threshold temperature, whereby polymerization occurs, and maintaining the polymerization mixture at such lower temperature until polymerization subsides. A critical aspect of this next step of the process is that the polymerization mixture remains quiescent during polymerization, whereby the mixture is permitted to initially form a gel which ultimately converts to high polymer. If the mixture is disturbed or agitated during polymerization, the resultant polychloral has diminished strength, toughness, and infrangibility.

The final step of the process is the separation of the aprotic liquid from the polymer. This step is unnecessary when polymerization is conducted in the absence of such liquid except that some liquid monomer may be present which can be removed such as by evaporation or solvent extraction.

The resultant polychloral has a tensile strength of at least 2,000 p.s.i., a Young's modulus of at least 50,000 p.s.i., toughness characterized by an impact strength of at least 0.2 ft. lb./in. and the ability of thin sections to be flexed without fracturing. The prior art polychlorals, in contrast, are frangible and therefore have extremely low tensile strength or toughness, much lower than just enumerated.

The polychlorals of this invention are readily oriented, such as by rolling at room temperature or by hot drawing at temperatures above 150° C. and particularly above 175° C. X-ray diffraction measurements confirm the orientation of the polymer. The polymer is transparent to translucent and can be drilled, sawed, machined, milled, carved, rolled, drawn, oriented, or otherwise converted to desired shapes. Shaped articles are conveniently formed by conducting at least the second step of the process in a mold having the desired shape. The polychlorals of this invention have a flammability rating of "non-burning by this test" in ASTM test D 635–63. Because of the frangible nature of polychloral of the prior art, the foregoing physical modifications could not be made.

To describe the process in greater detail, the process can be carried out in the presence of air. However, it is preferred to use an atmosphere to which chloral and the initiator are inert. Thus, it is desirable to exclude moisture, oxygen, carbon dioxide, acidic or basic vapors, and vapors of aprotic solvents. An inert atmosphere is preferred when pure chloral is to be held for substantial lengths of time prior to polymerization and is particularly advantageous when it is desired to hold a mixture containing chloral and a polymerization initiator above the threshold polymerization temperature of the composition for more than a few minutes. An inert atmosphere may be obtained by operating in nitrogen, helium, or the like, by operating at reduced pressures or by other means known in the art.

Polymerization initiators suitable for use in the process are those which initiate anionic polymerization. Effective initiating amounts of initiator are generally between 0.001 and 10.0% of the weight of the chloral. Preferred amounts are 0.05 to 5.0 wt. percent. Many of these are Lewis bases. Examples of initiators include: (a) Tertiary organic compounds of elements of Group VA of the periodic table, i.e., compounds $QR_3$ where Q is N, P, As, Sb, or Bi and R is a hydrocarbyl group containing 1–18 carbon atoms. The R's may be alike or different and can be taken together to indicate the hydrocarbon part of a cyclic 5- to 7-membered ring system in which Q is a heteroatom as in pyridine, substituted pyridines such as trimethylpyridine, quinoline, triethylenediamine, carbazole and alkyl, aryl and benzo derivatives of such compounds. Thus, the hydrocarbyl groups may be alkyl as in methyl, ethyl, dodecyl and octadecyl, alkenyl as in 9-octadecenyl, aryl as in phenyl, naphthyl, anthryl and benzanthryl, cycloalkyl as in cyclopropyl, cyclopentyl, cyclohexyl and cycloheptyl, aralkyl as in benzyl and phenethyl, alkaryl as in tolyl and xylyl and the like; (b) Onium, particularly ammonium, phosphonium and sulfonium fluorides, chlorides, bromides, iodides, hydroxides, alkoxides, thioalkoxides, carboxylates, cyanamides, cyanates, thiocyanates and azides. The onium cations may be hydrocarbyl substituted, the hydrocarbyl groups being as for the first described group by initiators; (c) Group IA, Group IIA, or Group IIIA metal hydrides, hydroxides, fluorides, alkyls, alkoxides, carboxylates, cyanamides, cyanates, thiocyanates, and azides.

The aprotic liquids, when used, must be unreactive with the chloral monomer and the initiator, and preferably good solvents for each and must be liquid at polymerization temperatures. Aromatic and aliphatic hydrocarbons, as well as ethers and ketones, are preferred. Toluene is particularly preferred. Halocarbons such as $CCl_4$, esters and amides such as dimethylformamide and dimethylacetamide are operable if the polymerization is carried out within less than 1 hr. and particularly less than a few minutes after mixing of chloral with the solvent and initiator. Specific solvents suitable for use in the polymerization of chloral according to this invention include benzene, n-hexane, cyclohexane, diethyl ether, anisole, acetone, methyl ethyl ketone, ethyl acetate, acetonitrile, nitrobenzene, methylene chloride, chloroform, tert-butyl chloride, dimethylsulfoxide, tetramethylurea, hexamethylphosphoramide and the like. The amount of aprotic liquid employed, if any, may be varied from 0–40% of the weight of the chloral being polymerized. Since the primary purpose for employing the aprotic liquid is to aid in dispersing the initiator in the chloral, it is preferred to use the minimum amount, i.e., up to 10% by wt., required to obtain this result.

With initiators which are readily soluble in warm chloral, no added liquid is required for dispersing purposes. A small amount of such liquid, however, may be desirable to permit shrinkage of the bulk polymer by evaporation of the liquid after polymerization of the chloral. This is sometimes useful in providing for removal of complicated solid shapes from the molds in which they are prepared.

The polymerization mixture can be prepared in the mold in which the polymer is to be formed or the mixture can be prepared in another container and then transferred to the mold which is at a temperature above the threshold polymerization temperature and which is then cooled therebelow to bring about polymerization.

The threshold polymerization temperature of a polymerization mixture containing monomeric chloral and an initiator, and optionally a solvent determined as follows: The mixture is prepared and thoroughly blended at an elevated temperature, for example, at its reflux temperature or at 65° C., whichever is lower. The mixture is then stirred and cooled at a rate of 2° C./min. The threshold polymerization temperature is that temperature at which there is noted the first haziness or opalescence due to solid polychloral separating in the mixture.

The chloral-initiator solvent compositions have threshold polymerization temperatures in the range from 30–60° C. At mixing temperatures below 30° C., the mixture tends to polymerize before mixing is complete. When from 0–10% my wt. of organic liquid is present, the threshold temperature is above 40° C. and usually above 45° C. The threshold temperature is affected by both the nature and the amount of any aprotic liquid that may be present. The maximum temperature at which the polymerization mixture is prepared is not critical and generally falls between the threshold polymerization temperature of the particular mixture and the reflux temperature thereof.

Polymerization of the chloral in polymerization mixture can be conducted at the threshold polymerization temperature. However, the heat of polymerization is most readily dissipated and the toughness and molecular weight of the polymer are increased if a polymerization temperature at least 5° C. below the threshold polymerization temperature is used, and preferably the temperature is at least 25° C. below and still more preferably, at least 50 to 135° C. below the threshold polymerization temperature.

In the process of this invention, the initiator is always uniformly distributed in the monomeric chloral before any polymerization occurs. Thus, when polymerization is brought about by cooling the composition below the threshold polymerization temperature, the composition becomes gelled and unflowable within one minute or less. The degree of conversion of monomer to polymer increases with time but generally is substantially complete within one hour.

The internal physical make-up of the shaped chloral polymers prepared according to this invention is such as to permit ready removal of any solvent or unpolymerized monomeric chloral by evaporation, extraction or other common means. This same make-up permits ready access to the interior of large moldings by gaseous reagents or solutions of agents for post-treatment or stabilization, or by solvents for removing initiator residues. Known post-treatments for stabilization of polyacetals such as acylation, as by means of benzoyl chloride or acetic anhydride, and treatment with phosphorus pentachloride, can be performed.

Specific embodiments of the invention are as follows, with parts and percents being by weight unless otherwise noted.

EXAMPLE 1

In an atmosphere of nitrogen, 75.60 g. (50 ml.) of freshly distilled monomeric chloral (shown by gas chromatography to contain less than 0.1% chloroform) was placed in a clean, flamed-out, 125 ml. glass flask fitted with a polytetrafluoroethylene-covered magnetic stirrer and a thermometer. With the flask and contents at 72° C., stirring was started and 77.8 mg. of lithium tert-butoxide (freshly sublimed at 150° C. and 0.1 mm. pressure) was dissolved in the chloral to give a clear solution. The liquid was then cooled at about 2° C. per minute. At 59° C., the first cloudiness due to polychloral formation was noted. Cooling was continued and at 53° C. stirring was stopped and the composition became a solid gel. After the composition came to room temperature, the flask was broken away and a tough, solid block of polychloral, the shape of the flask, was obtained.

EXAMPLE 2

In an atmosphere of nitrogen, a solution of 71.4 mg. of freshly sublimed lithium tert-butoxide in 4.33 g. (5 ml.) of reagent grade toluene was added to 68.04 g. (45 ml.) of freshly distilled chloral in a clean, flamed-out glass flask, all at 65° C. The clear solution was stirred and cooled at about 2° C. per minute. At 58° C., the first cloudiness due to polychloral formation was noted. At 48° C., the composition became a solid gel. After the composition came to room temperature, the flask was broken away, volatiles were evaporated, and a solid infrangible block of polychloral was obtained.

EXAMPLES 3-6

The procedure of Example 2 was repeated using varying proportions of chloral and toluene as indicated below. Mixing temperatures, cloud temperatures, and gel temperatures of the respective compositions were as indicated. All yielded tough, solid blocks of polychloral.

| Example | Lithium tert-butoxide (mg.) | Toluene (g.) | Chloral (g.) | Temperatures, °C. | | |
|---|---|---|---|---|---|---|
| | | | | Mixing | Cloud | Gel |
| 3 | 65.4 | 8.66 | 60.48 | 57 | 50 | 43 |
| 4 | 54.7 | 12.99 | 52.92 | 57 | 44 | 40 |
| 5 | 47.4 | 17.32 | 45.36 | 60 | 40 | 37 |
| 6 | 38.2 | 21.65 | 37.80 | 52 | 36 | 32 |

EXAMPLE 7

To 60.48 g. of freshly distilled chloral was added a solution of 0.08 g. of lithium tert-butoxide in 34.64 g. of toluene, all under nitrogen and at about 45° C. The resulting clear liquid was cooled rapidly to 0° C., during which time it gelled and polymerized to a hard solid. After 38 hours at 0° C., the composition was brought to room temperature and shown by nuclear magnetic resonance to have reached an equilibrium concentration of polymer. Volatiles were evaporated, and a solid infrangible block of polychloral was obtained.

EXAMPLE 8

A solution of 60.48 g. of chloral, 34.64 g. of toluene, and 0.08 g. of lithium tert-butoxide was prepared in a rubber-stoppered glass flask under nitrogen at 50° C. Portions of this solution were transferred to closed-end glass tubes (3–4 mm. I.D., 5 mm. O.D.) which in turn were sealed and placed in baths at 0° C and −78° C, respectively. After 12 days, the tubes were removed from the baths and shown by nuclear magnetic resonance to contain 90% and 86% yields of polychloral, respectively.

EXAMPLE 9

A solution of 10.584 g. of chloral, 2.598 g. of toluene, and 0.0144 g. of lithium tert-butoxide was prepared under nitrogen at 55° C. Polymerization in tubes at 0° C. and −78° C. was carried out by the procedure of Example 8. After 100 hours at the bath temperatures, the polymer yields were both 93%, as determined by nuclear magnetic resonance.

EXAMPLES 10-50

In each of 41 test tubes was placed 15.12 g. of freshly distilled chloral at 65° C. and under nitrogen. To the respective tubes were added the amounts of the initiators indicated below. After 5–10 minutes at 65° C., during which time there was no polymerization, the tubes were placed in a bath at 0° C. and kept there for 50 hours. Solid infrangible blocks of polychloral were formed in all the tubes.

| Example | Initiator | Amount (g.) |
|---|---|---|
| 10 | Lithium hydride | 0.005 |
| 11 | Lithium aluminum hydride | 0.019 |
| 12 | Sodium hydroxide | 0.040 |
| 13 | Potassium hydroxide | 0.029 |
| 14 | Sodium stearate | 0.150 |
| 15 | Potassium stearate | 0.160 |
| 16 | Potassium cyanide in dimethyl formamide | [1] 1 |
| 17 | Pyridine | [2] 3 |
| 18 | 2,4,6-trimethylpyridine | [2] 2 |
| 19 | Quinoline | [2] 2 |
| 20 | Imidazole | 0.030 |
| 21 | Triethylamine | [2] 2 |
| 22 | Dimethylaniline | [2] 3 |
| 23 | Hexamethylenediamine | ca. 0.050 |
| 24 | Cyclohexylcarbodiimide | 0.103 |
| 25 | Triethylamine: BH$_3$ | ca. 0.050 |
| 26 | Triethylphosphine | [2] 3 |
| 27 | Triphenylphosphine | 0.130 |
| 28 | Triphenylmethylphosphonium bromide | 0.180 |
| 29 | Aluminum triethyl | [2] 3 |
| 30 | Aluminum chloride | ca. 0.100 |
| 31 | Antimony pentachloride | [2] 10 |
| 32 | Lithium thiocyanate | 0.026 |
| 33 | Barium cyanide | 0.167 |
| 34 | Triphenyl arsine | 0.140 |
| 35 | Triphenyl stilbine | 0.180 |
| 36 | Triphenyl bismuthine | 0.200 |
| 37 | Cesium fluoride | 0.076 |
| 38 | Aluminum isopropoxide | 0.099 |
| 39 | Stannous octoate | 0.200 |
| 40 | Thiophene carboxylate | 0.070 |
| 41 | DHTA [3] chloride | 0.32 |
| 42 | DHTA [3] benzoate | 0.29 |
| 43 | DHTA trifluoroacetate | 0.30 |
| 44 | DHTA nitrate | 0.30 |
| 45 | DHTA picrate | 0.28 |
| 46 | DHTA acetate | 0.30 |
| 47 | DHTA tosylate | 0.30 |
| 48 | DHTA iodide | 0.30 |
| 49 | DHTA bromide | 0.20 |
| 50 | DHTA cyanate | 0.30 |

[1] Saturated solution (ml.).
[2] Drops.
[3] "Di(hydrogenated tallow) dimethylammonium." The hydrogenated tallow groups are $C_{16}$–$C_{18}$ alkyl groups, mostly $C_{18}$.

Other initiators which may be used in the procedure of Examples 10–50 to effect the polymerization of chloral include methylphenacylphenylsulfonium hydroxide, DHTA fluoride, DHTA ethoxide, DHTA cyanamide, DHTA thiocyanate, DHTA azide, sodium cyanamide, sodium thiocyanate, and sodium azide.

EXAMPLE 51

Two sheets of Pyrex plate glass 7″ x 7″ x ¼″ were separated by interlaying, about ½″ from the edge, a strand of elastic fiber about 5 mils thick. A gap was left between the ends of the fiber, near one corner, so that the space between the plates could be filled with liquid monomer. The assembly was held together with clamps and heated to 70° C. Chloral monomer, freshly distilled (60.48 g.), was heated in a nitrogen atmosphere to 70° C. A solution of 0.064 g. of freshly sublimed lithium tert-butoxide in about 1.68 g. of toluene was prepared and added to the chloral monomer at 70° C. This mixture, which remains unchanged over several hours at 70° C., is about 2.79% by weight toluene. A portion of the hot chloral/initiator solution was transferred, without allowing it to cool, to the space between the glass plates. The assembly was then allowed to cool to room temperature spontaneously, whereupon the monomeric chloral polymerized to a self-supporting, translucent film. After standing overnight at room temperature, the clamps were removed, the film stripped from the glass and soaked for one hour at room temperature in benzoyl chloride and then for one hour each in two changes of benzene. The film, after air-drying, was odorless, translucent, and tough. Toughness varied when the rate at which the assembly filled with initiated monomer was cooled to room temperature. The more rapidly the plates were cooled, the less opaque and tougher was the resulting film.

EXAMPLE 52

The procedure of Example 51 was repeated but the assembly was dropped into ice water immediately upon filling. The assembly was held at 0° C. for one hour and then at room temperature for 64 hours before the plates were unclamped and the film treated with benzoyl chloride as in Example 11. This film was almost transparent and was 4 to 6 mils thick. It could be folded double on itself without fracturing.

EXAMPLE 53

The procedure of Example 51 was repeated with an assembly which contained a copper/constantan thermocouple in the space between the plates. The hot assembly was then filled with a hot mixture prepared from 60.48 g. chloral and 0.32 g. lithium tert-butoxide in 0.84 g. toluene, and dropped immediately into a Dry Ice/acetone bath. The temperature indicated by the thermocouple fell rapidly from an initial 63° to 0° C. in 45 sec. to −20° C. in one minute, to −56° C. in 2 minutes and then leveled off at −66 to −65° C. after 5 minutes. This final low temperature was maintained for one hour before the assembly was removed from the cooling bath and allowed to warm spontaneously to room temeprature. The film was removed from the assembly and treated as before. It was substantially transparent, 2–3 mils thick and tougher than films polymerized at 0° C.

EXAMPLE 54

The procedure of Example 51 was repeated using plates separated with rubber tubing of 3/16 O.D. and 1/32" wall. The resulting polymer was a stiff, tough translucent plate about 30 mils thick.

EXAMPLE 55

The monomer/initiator mixture of Example 51 at 70 C. was sucked up into a 2-foot length of 6 mm. O.D. glass tubing and held there until a thin layer of the hot mixture next to the glass walls cooled enough to congeal to solid polymer. The still fluid material in the interior of the tubing was then allowed to drain out. After standing for about one hour at room temperature, the tube was filled with benzoyl chloride for one hour and then rinsed with benzene. Upon drying, the layer of polymer on the interior walls of the glass tube shrank slightly and could easily be removed to give a 2-foot length of thin-walled polychloral tubing slightly less in O.D. than the I.D. of the glass tubing in which it was made.

EXAMPLE 56

When the monomer/initiator mixture of Example 51 was sucked up into capillary glass tubing and allowed to cool to room temperature, a thin fiber of polymer was formed. The glass capillary was broken away to leave a fiber of polymer slightly smaller in diameter than the I.D. of the glass capillary. Fibers made in this manner were treated with benzoyl chloride and benzene as described in Example 51.

EXAMPLE 57

At 65° C. a solution of 0.0185 g. of lithium tertiary butoxide in about 0.43 g. of toluene was added to 15.12 g. of chloral. The resulting clear solution was transferred to a mold heated at 65° C. and consisting of two glass plates separated by a 25 mil polytetrafluoroethylene spacer. The assembly was immersed in a liquid bath at about −78° C. and held there for one hour. The resulting polychloral sheet was brought to room temperature, removed from the mold, soaked for 25 hours in benzoyl chloride, and then soaked in benzene for one day with three changes of benzene. It was dried under vacuum for three days at 0.2 mm. Strips of this polychloral sheet were oriented by rolling between adjustable steel rolls. One strip was reduced from 25 mils to 16 mils in thickness in 15 passes, being turned 180° between passes. X-ray diffraction analysis of the rolled strip showed linear orientation. Another strip was similarly reduced from 27 mils to 17 mils in thickness using a 90° turn between passes. X-ray diffraction analysis of this rolled strip showed biaxial orientation.

EXAMPLE 58

At 65° C. a solution of 0.074 g. of lithium tertiary butoxide in about 1.7 g. of toluene was added to 52.92 g. of chloral. The resulting clear solution was transferred to a mold heated at 65° C. and consisting of two glass plates separated by a 120 mil spacer. The assembly was immersed in a liquid bath at about −78° C. and held there for 20 hours. The resulting sheet of polychloral was brought to room temperature and removed from the mold. It was soaked for 20 hours in benzoyl chloride and then for eight hours in benzene. It was dried overnight under vacuum at 0.1 mm. The sheet showed a flex modulus of 350,000 p.s.i.

EXAMPLE 59

At 65° C. a solution of 0.0755 g. of lithium tertiary butoxide in about 2.1 g. of toluene was added to 151.2 g. of chloral. A mold 7" x ½" x ⅛" heated at 65° C. was filled with the resulting chloral/initiator solution. The assembly was immersed in a liquid bath at about −78° C. for one hour. It was held overnight at room temperature. The resulting polychloral bar was removed from the mold and heated at reflux for four hours in a mixture of one volume of acetic anhydride in 4 volumes of carbon tetrachloride. It was dried at room temperature by evacuating until a pressure below $0.5\mu$ was maintained. The bar was tested for flammability by ASTM test D 635–63 and rated "non-burning by this test."

EXAMPLE 60

At 65° C. a solution of 0.0112 g. of triethylenediamine in about 0.0769 g. of toluene was dissolved in 30.24 g. of chloral. The resulting clear solution was transferred to a mold heated at 65° C. and consisting of two glass plates separated by a 4–6 mil spacer. The assembly was immersed in a liquid bath at −50° C. for one hour and then held at room temperature for 2½ days. The resulting polychloral film was removed from the mold, air dried and then further dried by evacuating at room temperature. The film was tough and highly transparent.

EXAMPLE 61

At 65° C. a solution of 1.068 g. triphenylphosphine in 151.2 g. chloral was prepared. The resulting clear solution was transferred to a mold heated at 65° C. and consisting of two glass plates separated by a 3–4 mm. gum rubber spacer. The assembly was immersed in a liquid bath at −50° C. for one hour and then held over night at room temperature. The resulting polychloral sheet was removed from the mold and soaked for 4 hours in a refluxing mixture of 2,871 g. of carbon tetrachloride and 210 g. of phosphorus pentachloride. The sheet was then washed in fresh carbon tetrachloride and dried at room temperature by evacuating until a pressure below $0.5\mu$ was maintained. The sheet was 3.5 mm. thick. Test samples were machined from the sheet and the following measurements made:

Impact strength (notched Izod) \_\_\_ft. lb./in.\_\_   0.56
Tensile strength _____p.s.i\_\_\_\_  4,800
Elongation at break _____percent\_\_   11.1
Flex modulus _____p.s.i\_\_\_\_ 322,000

EXAMPLES 62–100

The polymerization of chloral with various solvents was carried out by adding 1 ml. of the solvent to 9 ml. of chloral in a test tube. In the case of benzophenone, 10% by wt. based on the weight of the chloral was used. The test tube was immediately closed with a rubber stopper and heated in an oil bath (65° C.) for 10 minutes. A 2-molar solution (0.2 ml.) of lithium-tertiary-butoxide in cyclohexane was added with a hypodermic syringe, the test tube was shaken until its contents were homogeneous. The test tube was then placed into a Dry Ice/acetone bath (−78° C.). After 30 minutes, all samples were completely polymerized to infrangible, tough objects having the shape of the test tube. The solvents tested are listed in the following table:

| Example: | Solvent |
|---|---|
| 62 | Benzene. |
| 63 | Toluene. |
| 64 | p-Xylene. |
| 65 | Tetrahydronaphthalene. |
| 66 | Cyclohexane. |
| 67 | n-Hexane. |
| 68 | Bromobenzene. |
| 69 | Nitrobenzene. |
| 70 | Diethyl ether. |
| 71 | Anisole. |
| 72 | Acetone. |
| 73 | 2-Butanone. |
| 74 | Ethylacetate. |
| 75 | Acetonitrile. |
| 76 | Methylene chloride. |
| 77 | Chloroform. |
| 78 | Carbon tetrachloride. |
| 79 | tert.-Butyl chloride. |
| 80 | Dimethylformamide. |
| 81 | Dimethylacetamide. |
| 82 | Hexamethylphosphoramide. |
| 82a | Dimethylsulfoxide. |
| 83 | Tetramethylurea. |
| 84 | n-Methyl pyrrolidone. |
| 85 | Tetrahydrofuran. |
| 86 | Dioxane. |
| 87 | Glyme (ethylene glycol dimethyl ether). |
| 88 | Diglyme (diethylene glycol dimethyl ether). |
| 89 | Triglyme (triethylene glycol dimethyl ether). |
| 90 | FC 75 (perfluoro-2-n-butyl tetrahydrofuran). |
| 91 | Benzophenone (1 g.). |
| 92 | Isobutyrophenone. |
| 93 | Decahydronaphthalene. |
| 94 | Dimethyl octadecanoamide. |
| 95 | Dimethyl decanoamide. |
| 96 | Dimethyl hexanoamide. |
| 97 | Dimethyl carbonate. |
| 98 | Hexamethylene dibromide. |
| 99 | Nitromethane. |
| 100 | Benzonitrile. |

The preferred conditions recited in this specification are applicable to the broad and narrow ranges defining the other conditions described. As many apparently widely different embodiments of this invention may be made without departing from the spirit and scope thereof, it is to be understood that this invention is not limited to the specific embodiments thereof except as defined in the appended claims.

What is claimed is:
1. A process for polymerizing chloral to polychloral having the repeating unit

comprising preparing a uniform mixture of an effective initiating amount of anionic polymerization initiator and chloral at a temperature above the threshold polymerization temperature of said mixture, said threshold temperature being in the range of 30 to 60° C., cooling said uniform mixture below said threshold temperature, whereby polymerization of said chloral to polychloral occurs and maintaining said uniform mixture quiescent during said polymerization.

2. The process of claim 1 wherein the temperature at which said mixture is prepared is between the reflux temperature thereof and 30° C.

3. The process of claim 2 wherein the last mentioned temperature is 45° C.

4. The process of claim 1 wherein the temperature to which said mixture is cooled is at least 25° C. below said threshold polymerization temperature.

5. The process of claim 1 wherein the temperature to which said mixture is cooled is below 30° C.

6. The process of claim 1 wherein said mixture contains from 0 to 40% of the weight of said chloral of an inert aprotic liquid.

References Cited

UNITED STATES PATENTS

| 3,272,777 | 9/1966 | Ishida | 260—67 |
| 3,183,213 | 5/1965 | Van Lohuizen et al. | 260—67 |
| 3,254,052 | 5/1966 | McCain et al. | 260—67 |

OTHER REFERENCES

Novak et al., Faraday Society Transactions, vol. 55, No. 441, September 1959. pp. 1490–1499.

WILLIAM H. SHORT, *Primary Examiner.*

L. M. PHYNES, *Assistant Examiner.*